United States Patent [19]
Marquis et al.

[11] Patent Number: 6,162,776
[45] Date of Patent: Dec. 19, 2000

[54] PAINT AND COATING REMOVER

[75] Inventors: Edward T. Marquis, Austin; Robert E. Baldwin, Georgetown, both of Tex.

[73] Assignee: Huntsman Petrochemical Corporation, Austin, Tex.

[21] Appl. No.: 09/417,137

[22] Filed: Oct. 12, 1999

Related U.S. Application Data

[63] Continuation of application No. 09/083,402, May 22, 1998, Pat. No. 6,040,284.
[60] Provisional application No. 60/047,529, May 23, 1997, and provisional application No. 60/048,450, Jun. 3, 1997.

[51] Int. Cl.$^7$ .............................. C11D 7/18; C09D 9/00; C23D 17/00
[52] U.S. Cl. ..................... 510/201; 510/202; 510/206; 510/211; 510/405; 510/432; 134/38
[58] Field of Search .............................. 134/38; 510/201, 510/202, 206, 211, 405, 432

[56] References Cited

U.S. PATENT DOCUMENTS

| | | | |
|---|---|---|---|
| 4,680,133 | 7/1987 | Ward | 252/153 |
| 5,215,675 | 6/1993 | Wilkins et al. | 252/100 |
| 5,456,853 | 10/1995 | Myers, II | 252/170 |
| 5,721,204 | 2/1998 | Maxwell et al. | 510/206 |
| 5,830,836 | 11/1998 | Smith et al. | 510/212 |

FOREIGN PATENT DOCUMENTS

97/29158  8/1997  WIPO .

*Primary Examiner*—Yogendra Gupta
*Assistant Examiner*—Charles Boyer
*Attorney, Agent, or Firm*—O'Keefe, Egan & Peterman LLP

[57] ABSTRACT

This invention concerns a composition useful as a paint remover, comprising: alkylene carbonate such as propylene carbonate or ethylene carbonate, hydrogen peroxide, and water, and optionally an alcohol such as benzyl alcohol. In another broad respect, this invention concerns a process for removing paint, comprising: applying a composition containing alkylene carbonate, hydrogen peroxide, and water to a painted surface for a time and under conditions effective to cause blistering or bubbling of the paint. In another broad respect, this invention is a composition useful as a paint remover, comprising: dialkyl carbonate, hydrogen peroxide, and water, optionally containing an alcohol, optionally containing a glycol ether. In another broad respect, this invention is a process for removing paint, comprising: applying a composition containing dialkyl carbonate, hydrogen peroxide, and water to a painted surface for a time and under conditions effective to cause blistering or bubbling of the paint.

15 Claims, No Drawings

PAINT AND COATING REMOVER

This application is a continuation of application Ser. No. 09/083,402, filed May 22, 1998, now U.S. Pat. No. 6,040,284 which claims priority to provisional application serial number 60/047,529, filed May 23, 1997 and provisional application 60/048,450, filed Jun. 3, 1997.

BACKGROUND OF INVENTION

This invention relates to compositions for paint and coating removal. More particularly, this invention relates to compositions containing alkylene carbonate or dialkyl carbonate or both, hydrogen peroxide, and water.

Paint removing compositions are commonly used in industry, such as for stripping paint from airplane fuselages. Conventional paint remover compositions include methylene chloride, phenol, or caustic. Each of these materials, however, has inherent problems during use. While methylene chloride based compositions are very effective as paint removers, methylene chloride is a highly volatile material which is considered toxic. Similarly, phenol is highly toxic. Furthermore, caustic causes burns and attacks aluminum. Due to the deficiencies and disadvantages of conventional paint removing compositions, new paint removing compositions are highly desirable.

SUMMARY OF INVENTION

In one broad respect, this invention is a composition useful as a paint remover, comprising: alkylene carbonate, hydrogen peroxide, and water.

In another broad respect, this invention is a process for removing paint, comprising: applying a composition containing alkylene carbonate, hydrogen peroxide, and water to a painted surface for a time and under conditions effective to cause blistering or bubbling of the paint.

In another broad respect, this invention is a process for removing paint, comprising: applying a composition containing (a) alkylene carbonate, dialkyl carbonate, or both, (b) hydrogen peroxide, and (c) water to a painted surface for a time and under conditions effective to cause blistering or bubbling of the paint.

In another broad respect, this invention is a composition useful as a paint remover, comprising: dialkyl carbonate, hydrogen peroxide, and water. This composition may optionally contain an alcohol, a glycol ether, an alkylene carbonate, or a combination thereof.

In another broad respect, this invention is a process for removing paint, comprising: applying a composition containing dialkyl carbonate, hydrogen peroxide, and water to a painted surface for a time and under conditions effective to cause blistering or bubbling of the paint.

The surfaces to be treated may be sealed with a variety of sealants, such as polysulfide, polyurethane, lacquer, epoxy, and the like. The compositions can be used to remove paints and coatings from furniture, automobiles, boats, trains, airplanes, military vehicles, and so forth.

This invention has a number of advantages. For example, the compositions have several important attributes, including low toxicity, high efficacy in removing paint and coatings, and neutral pH (or slightly acidic or slightly basic pH). Furthermore, in the case of propylene carbonate, the propylene carbonate breaks down into propylene glycol, which is non-toxic. Likewise, hydrogen peroxide decomposes over time to water. Hence, the propylene carbonate compositions of this invention are environmentally friendly, particularly as compared to chlorinated hydrocarbons and the like which are commonly used for paint and coating removing. In addition, the compositions of this invention cause blistering and bubbling in such a short period of time that it is envisioned that the compositions of this invention might be applied in liquid form, as opposed to the gels which are commonly applied which lesson evaporation of the chlorinated hydrocarbons, for example.

It has further been advantageously found that by employing hydrogen peroxide in the form of an at least 50% aqueous solution, a miscible solution forms with alkylene carbonate. In the context of this invention, by miscible solution it is meant a single phase solution. The resulting composition has surprisingly superior paint removing properties, which is believed to be due to the limited amount of water present. The compositions may be blended with additional cosolvents, activators, corrosion inhibitors, and the like, or may be used directly to effect paint removal. The compositions of this invention may advantageously be non-flammable, of low volatility and free of carcinogenic chemicals.

DETAILED DESCRIPTION OF THE INVENTION

The compositions of this invention contain alkylene carbonate or dialkyl carbonate or both, hydrogen peroxide, and water.

The hydrogen peroxide and water can be conveniently obtained from commercial sources as aqueous hydrogen peroxide solutions of varying percentages. Hydrogen peroxide is commonly available in aqueous solutions at a concentration of from about 1 to about 80 percent. For example, industrial solutions are often 30 percent or more by weight hydrogen peroxide solutions. It has been found that in the practice of this invention, the use of a 50% aqueous hydrogen peroxide solution is particularly effective. It may be appreciated that highly concentrated hydrogen peroxide should be handled carefully and appropriately since such materials are considered strong oxidizers. It may also be noted that once the concentrated hydrogen peroxide solution is admixed with carbonate, the concentration of hydrogen peroxide decreases which thus reduces the hazardous nature of the final composition. For example, when the overall concentration of hydrogen peroxide in the admixed composition is less than about 30%, special precautions need not be taken to handle the composition. Use of an aqueous hydrogen peroxide solution having a concentration of from about 30% to about 50% is preferred in the practice of this invention, with a concentration of about 50% providing a superior balance of paint stripping ability and miscibility with carbonate. In this regard, it should be appreciated that a lower hydrogen peroxide concentration of the aqueous solution may require use of cosolvents, surfactants, or the like to provide a miscible final composition.

In one embodiment of this invention, the amount of hydrogen peroxide in the total composition is at least 4 percent by weight. In another embodiment, the amount of hydrogen peroxide in the total composition is at least 10 percent by weight. In another embodiment of this invention, the amount of hydrogen peroxide is at least 15 percent by weight of the total composition or, alternatively, at least 35 percent by weight.

The alkylene carbonate used in the present invention can contain from 2 to 10 carbon atoms. Representative examples of alkylene carbonates that may be employed in the practice of this invention include ethylene carbonate and propylene carbonate. In the practice of this invention, propylene carbonate is preferred.

The dialkyl carbonate used in the present invention may contain from 3 to 25 carbon atoms. The dialkyl carbonate may be of formula R—$CO_3$—R', wherein R and R' may be the same or different, and may independently in each occurrence be alkyl of from 1 to about 12 carbon atoms. In one embodiment, the dialkyl carbonate may be dimethyl carbonate, diethyl carbonate, or a mixture thereof.

Concentrated solutions would range from about 8 to about 15 percent peroxide with the balance being water and dialkyl carbonate or dialkyl carbonate and alkylene carbonate.

The compositions of this invention may optionally include an alcohol. Representative examples of such alcohols include methanol, ethanol, propanol, butanol, and benzyl alcohol. In the practice of this invention, benzyl alcohol is preferred. Generally, compositions of this invention contain from 0 to about 90 percent by weight alcohol. For the removal of certain types of coatings, it has been found the efficiency of the carbonate hydrogen deoxidized water solution may be improved by the addition of an alcohol.

In certain embodiments of this invention, the compositions contain from about 10 to about 90 percent by weight alkylene carbonate, from about 0.1 to about 20 percent by weight hydrogen peroxide, and from about 0.1 to about 30 percent water. In certain embodiments of this invention containing alcohol, the compositions contain from about 10 to about 90 percent by weight alkylene carbonate, from about 10 to about 90 percent by weight alcohol, from about 0.1 to about 20 percent by weight hydrogen peroxide, and from about 0.1 to about 30 percent water.

In certain embodiments of this invention, the compositions contain from about 10 to about 90 percent by weight dialkyl carbonate, from about 0.1 to about 20 percent by weight hydrogen peroxide, and from about 0.1 to about 30 percent water. In certain embodiments of this invention, the compositions contain from about 10 to about 90 percent by weight dialkyl carbonate, from about 0 to about 90 percent by weight alcohol, from 0 to about 90 percent by weight glycol ether, from 0 to about 90 percent by weight alkylene carbonate, from about 0.1 to about 20 percent by weight hydrogen peroxide, and from about 0.1 to about 30 percent water.

In addition to the components described above, it is contemplated that the compositions of this invention may optionally contain activators such as formic or oxalic acid, thickeners, glycol ethers such as propylene glycol methyl ether (PM), dipropylene glycol methyl ether (DPM), or dipropylene glycol n-butyl ether (DPNB), surfactants, acids or bases, stabilizers, corrosion inhibitors, and other additives commonly used in paint removers.

Non-limiting examples of representative thickeners include cellulose ethers such hydroxypropyl cellulose, ethyl cellulose, ethyl hydroxyethyl cellulose, methyl cellulose, and other alkyl or hydrox alkyl cellulose; silica including colloidal silica; clays such as bentonite and montmorillonite starch; alumina including colloidal alumina; gum arabic; tragacanth; agar, sugar derivatives; high molecular weight polyethylene oxides; guar gum; xanthan gum; polyvinyl pyrrolidone and methyl vinyl ether/maleic anhydride copolymers. It has been found that certain hydroxy alkyl cellulose ethers and certain experimental polymers are particularly effective and resistant to breakdown in the practice of this invention. Such cellulose ethers are available commercially from The Dow Chemical Company under the tradename Methocal® F4MPRG and Dow's Experimental Polymer SCS 41067.06. When a thickener is used, the amount of such thickener can vary depending on the desired level of thickening for the given application. In general, the amount of thickener employed is about 1 to about 4 percent by weight.

Non-limiting examples of representative corrosion inhibitors include ethoxylated butynediol, petroleum sulfonates, blends of propargyl alcohol and thiourea. If used, the amount of such corrosion inhibitors is typically up to about 10% by weight of the total composition.

Chelating agents may also be added to the composition of this invention to complex with metal ions which may cause degradation of the peroxide. When used, chelating agents may be used in an amount up to about 10% by weight of the total composition. Representative examples of such chelating agents include, but are not limited to, ethylene diamine tetraacetic acid (EDTA) and its metal salts, diethylene triamine pentaacetic acid, polyphosphates, diketones, hydroxy carboxylic acids and phosphonic acids, and the like.

Non-limiting examples of representative stabilizers for hydrogen peroxide which may be included in the compositions of this invention include $C_{1-4}$ alkyl anilines, aromatic sulfonic acids, sulfamic acids, sulfones, sulfoxides, sulfolenes, sulfolanes, amino aryl sulfonic acid, benzene disulfonic acid, p-tolyl sulfonic acid, sulfanilic acid, propylene glycol, glycolic acid, glycerine, propionic acid, benzoic acid, cis-4-butenediol, and the like and mixtures thereof. The amount of such stabilizers may vary widely when used, and may be used in an amount typically up to about 10% by weight, preferably up to about 1%, of the total composition.

Non-limiting examples of representative surfactants which may optionally be used in the practice of this invention include non-ionic, anionic, cationic and amphoteric surfactants, such as monocarboxyl cocoimidoazoline, higher alkyl sulfate sodium salts, tridecyloxy poly(alkyleneoxy ethanol), ethoxylated or propoxylated alkyl phenol, alkyl sulfoamides, C10–18 alkaryl sulfonates such as alkylbenzene sulfonates, cocoamphaodipropionate, cetylpalmitic alkanol amides, hydrogenated castor oil, isooctylphenyl polyethoxy ethanol, sorbitan monopalmitate, C8–18 alkyl pyrrolidone, cocoaminoprpionic acid and polyethoxy amino salts thereof. When used, the amount of surfactant should be sufficient to render the composition miscible. Typically the amount of surfactant is from about 0.1 to about 10 percent by weight of the total composition.

The compositions of this invention may also optionally contain a wide variety of other organic cosolvents. Likewise, the present invention may be practiced in the absence of one or more of such solvents. Non-limiting examples of representative classes of such other cosolvents include hydrocarbons, glycols, glycol ethers, glycol ether esters, ethers, esters, phenols, glycols, sulfur-based solvents, chlorinated hydrocarbons, aromatic hydrocarbons nitrated hydrocarbons, amides, and ketones. Such cosolvents may be polar or non-polar, may be protic or aprotic, may be cyclic, branched, or straight-chain, and may contain one or more functional groups. Representative examples of common hydrocarbon solvents include hexane, toluene, xylene, and mixtures of aliphatic and aromatic hydrocarbons. Representative examples of common ether solvents include dibutyl ether, ethyl ether, and diphenyl ether. Representative examples of common ester solvents and lactones include material such as butyrolactone, ethyl acetate, butyl acetate, DBE (dibasic ester mixture from DuPont). Representative examples of common phenols include phenol and the Cresols and resorinols. Representative examples of common glycol solvents include ethylene, propylene and butylene glycols as well as methyl propane diol. Representative examples of common sulfur-based solvents include dimethylsulfoxide (DMSO) and sulfolane. Representative examples of common chlorinated hydrocarbon solvents include methylene chloride, methyl chloroform, chlorobenzenes and dichlorobenzenes. Representative examples of common nitrated hydrocarbon solvents include nitroethane and nitropropane. Representative examples of common amide solvents include formamide, dimethyl formamide, acetamide, and dimethylacetamide. Representative examples of common ketone solvents include acetone, methyl ethyl ketone (MEK), and methyl isobutyll ketone and methyl isoamylbutone.

When a given composition containing dialkyl carbonate does not form a miscible composition, a co-solvent may be used to provide a miscible composition. For instance, a glycol ether may be added as a co-solvent in an amount effective to solubilize the components of the mixture. Such glycol ethers may be included for other purposes as well. Such amounts may vary depending on the specific composition of interest, as one of skill in the art may appreciate. The particular type and amount of glycol ether which will afford a miscible composition may be identified by routine experimentation. Typically, the amount of glycol ether employed is less than about 90 percent by weight, and more typically from about 10 percent to about 50 percent. Also, an alcohol or alkylene carbonate may be beneficially employed as a co-solvent to provide miscible dialkyl carbonate compositions of this invention.

The conditions under which the paint stripping process of this invention may be practiced may vary. Typically, the process will be conducted under ambient atmospheric conditions. Temperatures from 0° F. to about 125° F., although higher temperatures may be used. The paint remover composition may be applied by any convenient method such as by dipping, spraying, or brushing the composition onto the paint surface. For resistant painted surfaces it may be desirable to apply the composition two or more times to fully separate the paint from the surface. It may be desirable to use a rag, scraper, sand blaster, or the like to fully remove paint chips from the surface after the paint remover composition has been given time to fully act. Alteratively, high pressure water spray may be employed to remove paint chips and residual paint remover composition. It may be appreciated that the time required for the paint remover composition to act will vary due to a variety of factors such as temperature, paint type, and particular paint remover formulation being used. In general, application times are between one minute and one hour, although longer application times may be used.

In the practice of this invention, it is contemplated that a thickener may be admixed into a stripping composition just prior to use. This is particularly desirable if thickeners are employed which are not stable in the hydrogen peroxide compositions for extended periods of time. Admixing may be effected by standard techniques, such as stirring agitation, and rolling. The particular mixing method must be tailored to the specific system being thickened. Likewise, the order or rate of addition of thickener and any other additives or components must be tailored to the specific solvent combination involved.

The following examples are illustrative of this invention and are not intended to be limit the scope of the invention or claims hereto. Unless otherwise denoted all percentages are by weight. In the tables, "N/A" denotes "not available."

EXAMPLE 1

Propylene Carbonate Composition

Various compositions were prepared containing propylene carbonate, as indicated in Table 1. In Table 1, the values for benzyl alcohol, propylene carbonate, formic acid, hydrogen peroxide, and water are based on weight percentages. The benzyl alcohol is an optionally included co-solvent. The hydrogen peroxide was delivered from a 30% aqueous solution. The compositions were applied to a standard aluminum panel having paint and coatings for military use (obtained from Scientific Material International, Inc. of Miami, Fla., Lot 96046-A2 4"×5", MIL-P-2337 primer, MIL-S-81733 Type 3 polysulfide sealant, MIL-C-83286), and allowed to sit on the panels. The propylene carbonate/hydrogen peroxide/water compositions was surprisingly effective in removing the paint and coatings. In Table 1, the runs in which hydrogen peroxide or propylene carbonate are lacking are not representative of the invention, and are presented for purposes of comparison only. Bubbling and blistering were observed by visual inspection.

The compositions have several important attributes, including low toxicity, high efficacy in removing paint and coatings, and neutral pH (or slightly acidic or slightly basic pH). Furthermore, propylene carbonate breaks down into propylene glycol, which is non-toxic, and hydrogen peroxide decomposes to water. Hence, the propylene carbonate compositions of this invention are environmentally friendly, particularly as compared to chlorinated hydrocarbons and the like which are commonly used for paint and coating removing. In addition, the compositions of this invention cause blistering and bubbling in such a short period of time that it is envisioned that the compositions of this invention can be applied in liquid form, as opposed to the gels which are commonly applied which lesson evaporation of the chlorinated hydrocarbons, for example. However, on difficult to remove coatings on vertical surfaces, thickeners such as Klucel H (Hercules, Aqualon Division), Dow's Methocal® F4MPRG or Dow's experimental polymer XCS 41067.06 may be required to obtain effective coating removal.

TABLE 1

| Benzyl Alcohol | Propylene Carbonate | Formic Acid | Hydrogen peroxide | Water | Minutes to Blister | Minutes to Bubble |
|---|---|---|---|---|---|---|
| 60 | 40 | 0 | 0 | 0 | 720* | N/A |
| 58.2 | 38.8 | 3 | 0 | 0 | N/A | 360* |
| 56.4 | 37.6 | 6 | 0 | 0 | N/A | 345* |
|  | 80 | 0 | 6 | 14 | 24 | 64 |
| 54 | 36 | 0 | 3 | 7 | 32 | 44 |
| 48 | 32 | 0 | 6 | 14 | 20 | 35 |
| 40 | 40 | 0 | 6 | 14 | 20 | 28 |
| 30 | 50 | 0 | 6 | 14 | 25 | 33 |
| 20 | 60 | 0 | 6 | 14 | 31 | 38 |
| 80 | 0 | 0 | 6 | 14 | Iminiscible, 2 phases* | |

The "*" denotes experiments that are not representative of this invention, and are presented for comparison only.

EXAMPLE 2

Ethylene Carbonate Composition

Various compositions were prepared containing ethylene carbonate, as indicated in Table 2. In Table 2, the values for benzyl alcohol, ethylene carbonate, formic acid, hydrogen peroxide, and water are based on weight percentages. As in Example 1, the compositions were applied to a standard panel having paint and coatings for military use (obtained from Scientific Material International, Inc., Lot 96046-A2 4"×5", MIL-P-2337 primer, MIL-S-81733 Type 3 polysulfide sealant, MIL-C-83286). The ethylene carbonate/benzyl alcohol/hydrogen peroxide/water compositions were surprisingly effective in removing the paint and coatings. In Table 2, the runs in which hydrogen peroxide or ethylene carbonate are lacking are not representative of the invention, and are presented for purposes of comparison only.

The compositions have several important attributes, including low toxicity, high efficacy in removing paint and coatings, and neutral pH (or slightly acidic or slightly basic pH). In addition, the compositions of this invention cause blistering and bubbling in such a short period of time that it is envisioned that the compositions of this invention can be applied in liquid form, as opposed to the gels which are commonly applied which lesson evaporation of the chlorinated hydrocarbons, for example. However, on difficult to remove coatings on vertical surfaces, thickeners such as Klucel H (Hercules, Aqualon Division) or Dow's Methocal® F4MPRG or Dow's experimental polymer XCS 41067.006 may be required to obtain effective coating removal.

TABLE 2

| Benzyl Alcohol | Ethylene Carbonate | Formic Acid | Hydrogen peroxide | Water | Minutes to Blister | Minutes to Bubble |
|---|---|---|---|---|---|---|
| 60 | 40 | 0 | 0 | 0 | >150* | N/A |
| 58.2 | 38.8 | 3 | 0 | 0 | 100* | >150* |
| 56.4 | 37.6 | 6 | 0 | 0 | 41* | >150* |
| 54 | 36 | 0 | 3 | 7 | 30 | 36 |
| 45 | 45 | 0 | 3 | 7 | 33 | 40 |
| 48 | 32 | 0 | 6 | 14 | 20 | 30 |
| 40 | 40 | 0 | 6 | 14 | 25 | 35 |
| 42 | 28 | 0 | 9 | 21 | 20 | 32 |
| 35 | 35 | 0 | 9 | 21 | 20 | 35 |

The "*" denotes experiments that are not representative of this invention, and are presented for comparison only.

a "†" in the Miscible column, a glycol ether was needed to form a miscible composition. As in Example 1, the compositions were applied to a standard panel having paint and coatings for military use (obtained from Scientific Material International, Inc., Lot 96046-A2 4"×5", MIL-P-2337 primer, MIL-S-81733 Type 3 polysulfide sealant, MIL-C-83286). The dialkyl carbonate compositions were surprisingly effective in removing the paint and coatings. In Table 3, the runs in which the composition was not miscible are not representative of the invention, and are presented for purposes of comparison only.

The compositions have several important attributes, including low toxicity, high efficacy in removing paint and coatings, and neutral pH (or slightly acidic or slightly basic pH). In addition, the compositions of this invention cause blistering and bubbling in such a short period of time that it is envisioned that the compositions of this invention can be applied in liquid form, as opposed to the gels which are commonly applied which lesson evaporation of the chlorinated hydrocarbons, for example. However, on difficult to remove coatings on vertical surfaces, thickeners such as Klucel H (Hercules, Aqualon Division) or Dow's Methocal® F4MPRG or Dow's Experimental polymer XCS 41067.06 maybe required to obtain effective coating removal.

TABLE 3

| DMC | DEC | PC | BA | PNB | DPNB | $H_2O_2$ | Water | Miscible | Minutes to Blister | Minutes to Bubble |
|---|---|---|---|---|---|---|---|---|---|---|
| 61.5 | 0 | 0 | 0 | 23.1 | 0 | 4.6 | 10.8 | Yes† | 20 | 30 |
| 0 | 53.3 | 0 | 0 | 0 | 33.3 | 4.0 | 9.3 | No* | N/A | N/A |
| 60 | 0 | 20 | 0 | 0 | 0 | 6.0 | 14.0 | Yes | 20 | 30 |
| 40 | 0 | 40 | 0 | 0 | 0 | 6.0 | 14.0 | Yes | 30 | 42 |
| 20 | 0 | 60 | 0 | 0 | 0 | 6.0 | 14.0 | Yes | 55 | 60 |
| 0 | 40.0 | 13.3 | 0 | 0 | 33.3 | 4.0 | 9.3 | No* | N/A | N/A |
| 0 | 27.6 | 27.6 | 0 | 0 | 31.0 | 4.1 | 9.6 | Yes† | 50 | 60 |
| 0 | 17.4 | 52.2 | 0 | 0 | 13.0 | 5.2 | 12.2 | Yes† | 40 | 45 |
| 50.0 | 0 | 0 | 16.7 | 16.7 | 0 | 5.0 | 11.6 | Yes† | 20 | 30 |
| 33.3 | 0 | 0 | 33.3 | 16.7 | 0 | 5.0 | 11.7 | Yes† | 25 | 30 |
| 16.0 | 0 | 0 | 48.0 | 20.0 | 0 | 4.8 | 11.2 | Yes† | 20 | 40 |
| 0 | 40.0 | 0 | 13.3 | 0 | 33.3 | 4.0 | 9.3 | No* | N/A | N/A |
| 0 | 26.7 | 0 | 26.7 | 0 | 33.3 | 4.0 | 9.3 | NO* | N/A | N/A |
| 0 | 13.3 | 0 | 40.0 | 0 | 33.3 | 4.0 | 9.3 | Yes† | 35 | 55 |
| 30 | 0 | 30 | 20 | 0 | 0 | 6 | 14 | Yes | 20 | 40 |
| 20 | 0 | 20 | 40 | 0 | 0 | 6 | 14 | Yes | 25 | 40 |
| 8.3 | 0 | 8.3 | 50.0 | 16.7 | 0 | 5.0 | 11.7 | Yes† | 30 | 45 |
| 0 | 20.0 | 20.0 | 13.3 | 0 | 33.3 | 4.0 | 9.3 | Yes† | 45 | 60 |
| 0 | 13.3 | 13.3 | 26.7 | 0 | 33.3 | 4.0 | 9.3 | Yes† | 49 | 60 |
| 0 | 6.7 | 6.7 | 40.0 | 0 | 33.3 | 4.0 | 9.3 | Yes† | 49 | 60 |

The "*" denotes experiments that are not representative of this invention, and are presented for comparison only.

EXAMPLE 3

Dialkyl Carbonate Compositions

Various compositions were prepared containing the dialkyl carbonates dimethyl carbonate (DMC) and diethyl carbonate (DEC), as indicated in Table 3. In Table 3, the values for benzyl alcohol (BA), propylene carbonate (PC), propylene glycol n-butyl ether (PNB), and dipropylene glycol n-butyl ether (DPNB) are based on weight percentages. For some of the compositions in Table 3 denoted with

EXAMPLE 4

Stability of Propylene Carbonate Compositions

A number of compositions were prepared containing propylene carbonate (PC), water, hydrogen peroxide ($H_2O_2$), and varying amounts of stabilizer. The compositions were then placed in containers and periodically monitored to determine $H_2O_2$ content. The results are reported in Table 4.

TABLE 4

Weight % of Compounds in Original Solution

| Composition | PC | Stabilizer | Amount Of Stabilizer | $H_2O_2$ | $H_2O$ | $H_2O_2$ Concentration | | | | | |
|---|---|---|---|---|---|---|---|---|---|---|---|
| | | | | | | 2 weeks | 4 weeks | 6 weeks | 8 weeks | 10 weeks | 12 weeks |
| 4-A | 57.1 | None | — | 15.0 | 27.9 | 14.9 | 14.7 | 14.4 | 14.7 | 13.9 | 14.6 |
| 4-B | 61.5 | Benzoic Acid | 0.1 | 13.4 | 25.0 | | 13.5 | | 13.2 | 13.1 | 13.1 |
| 4-C | 57.1 | Benzoic Acid | 0.1 | 15.0 | 27.8 | 15.0 | 14.8 | 14.7 | 13.6 | 14.2 | 14.7 |
| 4-D | 57.1 | Benzoic Acid | 0.05 | 15.0 | 27.8 | 14.9 | 14.8 | 14.7 | 14.9 | 14.0 | 14.7 |
| 4-E | 57.1 | Benzoic Acid | 0.01 | 15.0 | 27.9 | 14.8 | 14.8 | 14.7 | 14.5 | 12.8 | 14.6 |
| 4-F | 57.1 | DeQuest ™ 2010 | 0.1 | 15.0 | 27.8 | 14.9 | 14.9 | 15.0 | 14.7 | 14.4 | 14.9 |
| 4-G | 57.1 | DeQuest ™ 2010 | 0.05 | 15.0 | 27.8 | 14.9 | 14.9 | 14.7 | 14.1 | 14.6 | 12.6 |
| 4-H | 57.1 | DeQuest ™ 2010 | 0.01 | 15.0 | 27.9 | 14.9 | 15.0 | 14.8 | 14.8 | 14.2 | 14.6 |

The date in Table 4 shows that, surprisingly, carbonate/water/$H_2O_2$ compositions are stable. Thus, the hydrogen peroxide does not decrease in amount to any appreciable degree over a 12 week span. Furthermore, it was found that, unexpectedly, the compositions were single phase despite high $H_2O$ loadings of 25 percent or more. This is particularly notable because water and propylene carbonate are only partially miscible. At the loadings in the examples in Table 4, phase separation occurs in the absence of hydrogen peroxide. While not wishing to be bound by theory, it is contemplated that the hydrogen peroxide functions as a coupler to provide a single phase solution. The data in Table 4 also appears to suggest that use of a stabilizer is not particularly important to maintain a stable composition and, as such, is optionally employed in the practice of this invention. It is thus notable that compositions having 15 percent or more peroxide are stable.

The fluctuations in concentration in Table 4 (i.e., an increase in peroxide) are attributable to normal experimental error.

EXAMPLE 5

Thickened Compositions

A number of carbonate compositions were prepared by mixing components with stirring. Various thickeners were included in the compositions. The compositions are described in Table 5-A. In Table 5-A, "a" denotes methyl cellulose (Dow Chemical's Methocell™ 311), "b" denotes hydroxy propyl cellulose (Klucel™ H cellulose from Aqualon), and "c" denotes hydroxy propyl methyl cellulose (Methocell™ F4MPRG by Dow Chemical).

TABLE 5-A

| | Weight % of Components | | | | |
|---|---|---|---|---|---|
| Composition | Benzyl Alcohol | PC | $H_2O_2$ | $H_2O$ | Thickener |
| 5-A | 48.0 | 32.0 | 6.3 | 11.7 | 2.0b |
| 5-B | 46.60 | 31.00 | 7.00 | 13.00 | 2.40b |
| 5-C | 45.60 | 30.40 | 7.00 | 13.00 | 4.00b |
| 5-D | 46.32 | 30.88 | 7.00 | 13.00 | 2.80a |
| 5-E | 46.46 | 30.97 | 7.09 | 13.18 | 2.30a |
| 5-F | 46.32 | 30.88 | 7.00 | 13.00 | 2.80c |
| 5-G | 46.46 | 30.97 | 7.09 | 13.18 | 2.30c |
| 5-H | 46.46 | 30.97 | 7.09 | 13.18 | 2.30b |
| 5-I | 46.32 | 30.88 | 7.00 | 13.00 | 2.80b |
| 5-J | 46.6 | 31.1 | 7.0 | 13.0 | 2.3b |
| 5-K | 46.5 | 31.0 | 7.0 | 13.0 | 2.5b |
| 5-L | 46.4 | 30.9 | 7.0 | 13.0 | 2.7b |
| 5-M | 46.3 | 30.8 | 7.0 | 13.0 | 2.9b |
| 5-N | 46.6 | 31.1 | 7.0 | 13.0 | 2.3c |
| 5-O | 46.5 | 31.0 | 7.0 | 13.0 | 2.5c |
| 5-P | 46.4 | 30.9 | 7.0 | 13.0 | 2.7c |
| 5-Q | 46.3 | 30.8 | 7.0 | 13.0 | 2.9c |
| 5-R | 46.7 | 31.2 | 7.0 | 13.0 | 2.1b |
| 5-S | 46.9 | 31.2 | 7.0 | 13.0 | 1.9b |
| 5-T | 47.0 | 31.3 | 7.0 | 13.0 | 1.7b |
| 5-U | 47.1 | 31.4 | 7.0 | 13.0 | 1.5b |

All of compositions 5-A through 5-U were single phase. The compositions were then placed in closed vessels and monitored for both viscosity stability and $H_2O_2$ stability. The results of these tests are shown in Table 5-B. "N/A" denotes that no data was collected for the given entry.

TABLE 5-B

| | Room Temperature Viscosity cps | | | | | | $H_2O_2$ Concentration, Weight % | | | | | |
|---|---|---|---|---|---|---|---|---|---|---|---|---|
| Composition | 2 Weeks | 4 Weeks | 8 Weeks | 12–14 Weeks | 16 Weeks | 20–21 Weeks | 2 Weeks | 4 Weeks | 8 Weeks | 12–14 Weeks | 16 Weeks | 20–21 Weeks |
| 5-A | N/A | N/A | 2560 | 1930 | 2260 | 1740 | 6.2 | 6.3 | 6.2 | 6.2 | 5.9 | 5.9 |
| 5-B | 3720 | 2740 | 2860 | 1960 | 1610 | N/A | 6.6 | 7.1 | 7.0 | 6.8 | 6.8 | N/A |

TABLE 5-B-continued

| | Room Temperature Viscosity cps | | | | | | H₂O₂ Concentration, Weight % | | | | | |
|---|---|---|---|---|---|---|---|---|---|---|---|---|
| Composition | 2 Weeks | 4 Weeks | 8 Weeks | 12–14 Weeks | 16 Weeks | 20–21 Weeks | 2 Weeks | 4 Weeks | 8 Weeks | 12–14 Weeks | 16 Weeks | 20–21 Weeks |
| 5-C | 18000 | 12160 | 9440 | 5200 | 4380 | N/A | 7.2 | 6.9 | 7.1 | 7.0 | 7.0 | N/A |
| 5-D | 416 | 97 | N/A | 96 | 64 | N/A | 6.3 | 6.5 | 6.4 | 6.4 | 5.9 | N/A |
| 5-E | 220 | 55 | N/A | 78 | 58 | N/A | 6.6 | 6.6 | 6.4 | 6.3 | 6.3 | N/A |
| 5-F | 40400 | 21280 | 16080 | 13300 | 8640 | N/A | 7.0 | 6.9 | 6.4 | 6.8 | 6.8 | N/A |
| 5-G | 17120 | 13900 | 8400 | 4500 | 4400 | N/A | 5.5 | 6.7 | 7.0 | 6.7 | 6.8 | N/A |
| 5-H | 4880 | 5080 | 4520 | 2800 | 3280 | N/A | 7.1 | 7.1 | 6.5 | 6.5 | 6.9 | N/A |
| 5-I | 8320 | 7640 | 7680 | 6760 | 6400 | N/A | 7.1 | 7.1 | 7.1 | 7.1 | 7.0 | N/A |
| 5-J | 1380 | 1155 | 972 | N/A | N/A | N/A | 6.0 | 7.0 | 6.2 | N/A | N/A | N/A |
| 5-K | 1090 | 528 | 272 | N/A | N/A | N/A | 6.8 | 6.7 | 2.4 | N/A | N/A | N/A |
| 5-L | 59 | 32 | 23 | N/A | N/A | N/A | 6.0 | 5.8 | 5.5 | N/A | N/A | N/A |
| 5-M | 24 | 20 | 15 | N/A | N/A | N/A | 5.2 | 4.3 | 3.9 | N/A | N/A | N/A |
| 5-N | 15600 | 4280 | 2280 | N/A | N/A | N/A | 7.0 | 7.1 | 6.5 | N/A | N/A | N/A |
| 5-O | 2100 | 432 | 221 | N/A | N/A | N/A | 6.7 | 6.2 | 6.3 | N/A | N/A | N/A |
| 5-P | 6400 | 1380 | 650 | N/A | N/A | N/A | 6.9 | 6.8 | 6.5 | N/A | N/A | N/A |
| 5-Q | 46400 | 19000 | 11500 | N/A | N/A | N/A | 6.6 | 6.7 | 6.9 | N/A | N/A | N/A |
| 5-R | 28 | N/A | 27.2 | N/A | N/A | N/A | 6.1 | N/A | 5.7 | N/A | N/A | N/A |
| 5-S | 16 | N/A | 18.4 | N/A | N/A | N/A | 5.6 | N/A | 5.0 | N/A | N/A | N/A |
| 5-T | 29 | N/A | 24.7 | N/A | N/A | N/A | 6.3 | N/A | 5.9 | N/A | N/A | N/A |
| 5-U | 33 | N/A | 26.8 | N/A | N/A | N/A | 6.6 | N/A | 6.2 | N/A | N/A | N/A |

The data in Table 5-B shows that the compositions of this invention that optionally contain a thickener are stable. It can be seen that efficacy of the thickener may vary depending on type of thickening agent. It can also be seen that in some instances (i.e., 5-R through 5-U) that the amount of thickening agent needed to effect thickening will vary. Since in general viscosity decreases over time, in some instances it may be preferable to add the thickener immediately preceding application to a surface to be treaded.

What is claimed is:

1. A composition useful as a paint remover, comprising: dialkyl carbonate, hydrogen peroxide, and water, wherein about 10 to about 90 percent by weight dialkyl carbonate, about 0.1 to about 20 percent by weight hydrogen peroxide, and about 0.1 to about 30 percent water are present in the composition.

2. The composition of claim 1, wherein the dialkyl carbonate is dimethyl carbonate, diethyl carbonate, or mixtures thereof.

3. The composition of claim 1 in the form of a miscible solution.

4. The composition of claim 1, further comprising a glycol ether.

5. A miscible composition useful as a paint remover, comprising: from about 10 to about 90 percent by weight dimethyl carbonate or diethyl carbonate, from about 0 to about 90 percent by weight benzyl alcohol, from 0 to about 90 percent by weight glycol ether, from 0 to about 90 percent by weight alkylene carbonate, from about 0.1 to about 20 percent by weight hydrogen peroxide, and from about 0.1 to about 30 percent water.

6. A process for removing paint, comprising: applying a composition containing dialkyl carbonate, hydrogen peroxide, and water to a painted surface for a time and under conditions effective to cause the paint to separate from the surface, wherein the composition comprises about 10 to about 90 percent by weight dialkyl carbonate, about 0.1 to about 20 percent by weight hydrogen peroxide, and about 0.1 to about 30 percent water.

7. The process of claim 6, wherein the dialkyl carbonate is dimethyl carbonate, diethyl carbonate, or mixtures thereof.

8. The process of claim 6 wherein the composition is in the form of a miscible solution.

9. The process of claim 6, wherein the composition further comprises a glycol ether.

10. The process of claim 6 wherein the composition is a miscible composition comprising: from about 10 to about 90 percent by weight dimethyl carbonate or diethyl carbonate, from about 0 to about 90 percent by weight benzyl alcohol, from 0 to about 90 percent by weight glycol ether, from about 0.1 to about 20 percent by weight hydrogen peroxide, and from about 0.1 to about 30 percent water.

11. A process for the production of a paint remover composition, comprising: combining (a) dialkyl carbonate and (b) an aqueous hydrogen peroxide solution to form the composition, wherein the composition comprises about 10 to about 90 percent weight dialkyl carbonate, about 0.1 to about 20 percent by weight hydrogen peroxide, and about 0.1 to about 30 percent water.

12. A process for removing a coating from a surface, comprising:

providing a miscible composition of dialkyl carbonate, hydrogen peroxide, and water, wherein the composition comprises about 10 to about 90 percent by weight dialkyl carbonate, about 0.1 to about 20 percent by weight hydrogen peroxide, and about 0.1 to about 30 percent water;

adding a thickening agent to the miscible composition and mixing the resulting composition to form a thickened composition;

applying the thickened composition to a coated surface for a time sufficient and under conditions effective to separate at least a portion of the coating from the surface; and removing the coating and thickened composition from the surface.

13. The process of claim 12 wherein the coating is paint.

14. The process of claim 12 wherein the dialkyl carbonate is dimethyl carbonate, diethyl carbonate, or mixtures thereof.

15. The process of claim 12 wherein the surface is aluminum.

* * * * *